April 27, 1926.
W. A. FOSS
ARTIFICIAL BAIT
Filed June 22, 1923
1,582,171
Fig. 1.
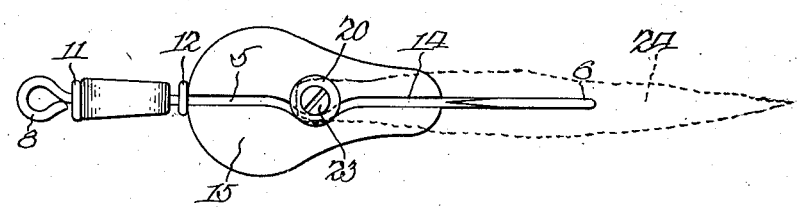
Fig. 2.
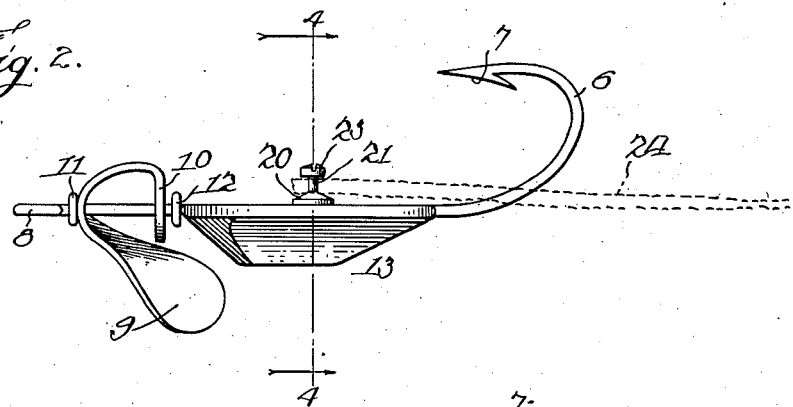
Fig. 3.
Fig. 4.
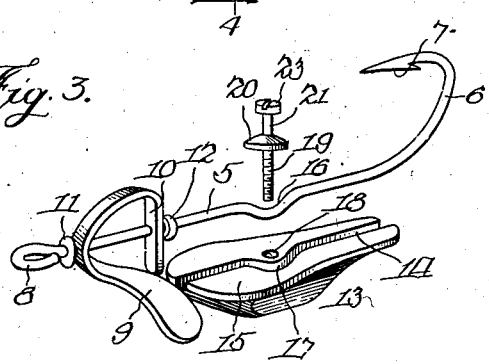
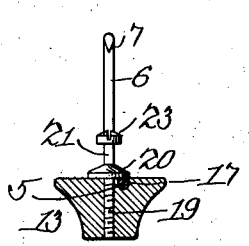
Inventor:
William A. Foss
By Fred Gerlach
his Atty Patented Apr. 27, 1926.

1,582,171

UNITED STATES PATENT OFFICE.

WILLIAM A. FOSS, OF CLEVELAND, OHIO.

ARTIFICIAL BAIT.

Application filed June 22, 1923. Serial No. 647,079.

*To all whom it may concern:*

Be it known that I, WILLIAM A. Foss, a citizen of the United States, and a resident of Cleveland, in the county of Cuyahoga and State of Ohio, have invented certain new and useful Improvements in Artificial Bait, of which the following is a full, clear, and exact description.

The invention relates to artificial bait. Heretofore, it has been the practice to cast a weight around the shank of a fish-hook. In bait thus constructed, the entire bait became useless when the hook was broken or damaged and, furthermore, it was not possible to apply weights of different sizes to the hook by the user.

The object of the present invention is to provide an improved bait of the type in which a weight is secured to the shank of the hook in such a manner that it can be re-used when the hook becomes damaged or broken and which permits weights of different sizes to be attached to the hook when desired.

The invention consists in the several novel features hereinafter set forth and more particularly defined by claims at the conclusion hereof.

In the drawings: Fig. 1 is a plan of bait embodying the invention. Fig. 2 is a side elevation. Fig. 3 is a perspective, the parts being separated for illustrative purposes. Fig. 4 is a section on line 4—4 of Fig. 2.

The invention is exemplified in a fish hook comprising a shank 5, a hook proper 6 provided with a barb 7 at the rear of the shank and an eye 8 integrally formed at the front end of the shank. A spinner is rotatably mounted on the front end of the shank adjacent eye 8 and comprises a blade 9 and an arm 10. Shank 5 extends through the spinner and is confined to the front thereof by suitable stops 11 and 12. A one-piece weight 13 extends longitudinally of the shank and has a longitudinally extending groove 14 in its upper face which is adapted to receive that portion of the shank of the hook which is disposed rearwardly of shoulder 12. This weight is preferably made of die-cast metal. The top face 15 of the weight is approximately flat and the underside has its front, rear and sides tapered to facilitate its passage through the water. The shank 5 of the hook is bent laterally or offset, as at 16, and the groove 14 in the top face of weight 13 is provided with a correspondingly shaped offset portion 17 to receive portion 16 of the hook. The weight 13 is preferably formed of metal and is provided with a threaded hole 18 to receive the threaded portion 19 of a screw which is provided with a shoulder 20 adapted to overlap portions 16 and 17 of shank 5 and groove 14, so that the hook will be secured in the weight by confining the hook in groove 14. The offset 16 on the hook shank 5 causes the hook to be secured so that there will be no substantially relative rotation between the hook and the weight. This is an important feature in devices of this character in which it is desired to retain the hook proper in a definite relation with respect to the weight. The screw 16 is extended, as at 21, about shoulder 20 and provided at its upper end with a head 23 to form a stud for attachment of the front end of a pork rind strip. In practice, the hook 6 is usually extended through a pork rind strip, as indicated by dotted lines 24, so that its front portion will be secured on the hook, the rear portion being free to wiggle responsively to the vibration and waves produced by the spinner 9.

The invention exemplifies an artificial bait in which a metallic weight is efficiently secured to the shank of a fish-hook without casting the weight around the shank. By grooving the upper faces of the shank and the offset connection between the shank of the hook and the weight, the hook and weight will be secured against relative movement in any direction. By using a screw or other suitable means to removably hold the hook in the groove of the weight, it becomes possible to apply different sizes of weights when desired and, furthermore, if the hook should become broken, a new one may be substituted and the weight will remain usable. These hooks are usually made of flexible wire, so that when the front end of the wire forming the eye 8 is straightened out, the spinner may be removed and also placed on a new hook. A further characteristic of the construction described is that when the shank of the hook is secured in a groove or on the top of the weight, the center of gravity is lowered, thus causing the bait to quickly assume its correct position in retrieving the bait after a cast.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In artificial bait, the combination of a hook comprising an eye, a shank, and a hook proper, a weight having an open groove in one of its faces to receive the shank, and means for securing the shank in said groove, said eye being disposed in front of the weight.

2. In artificial bait, the combination of a hook comprising an eye, a shank, and a hook proper, a weight having an open groove in one of its faces to receive the shank, and means for removably securing the shank in said groove comprising a part to overlap the shank and groove and a part extending through the weight, said eye being disposed in front of said weight.

3. In artificial bait, the combination of a hook comprising an eye, a shank, and a hook proper, a weight extending longitudinally of the shank and having a groove in its upper face, the latter being approximately flush with the shank, and a stud secured in the shank and provided with means to secure the shank in the groove, said eye being disposed in front of the weight.

4. In artificial bait, the combination of a hook comprising a shank and a hook proper, a spinner on the front end of the shank, a weight having an open groove in one of its faces to receive the shank, and means for securing the shank in said groove provided with means for connection to a tail strip.

5. In artificial bait, the combination of a fish-hook comprising an eye, a shank, and a hook proper, the shank being provided with an offset between said eye and hook proper, a weight provided with an open groove in one of its faces having an offset to receive the shank of the hook with its offset, and means for securing the hook in said groove.

6. In artificial bait, the combination of a fish-hook comprising an eye, a shank, and a hook proper, the shank being provided with an offset between said eye and hook proper, a weight provided in its upper face with an open groove having an offset portion to receive the shank of the hook with its offset, the upper face being approximately flush with the shank, and a stud extending into the weight and provided with means to overlap the offset on the shank and secure it in the groove.

7. In artificial bait, the combination of a fish-hook comprising a shank and a hook proper, a spinner on the front end of the shank, the shank being provided with an offset, a weight provided with an open groove in its upper face and an offset to receive the shank of the hook with its offset, and a stud extending into the weight and provided with a shoulder to clamp the shank in the groove and an extension above the shoulder for connection to a flexible strip.

Signed at Cleveland, Ohio, this 1st day of June, 1923.

WILLIAM A. FOSS.